Figure 3:
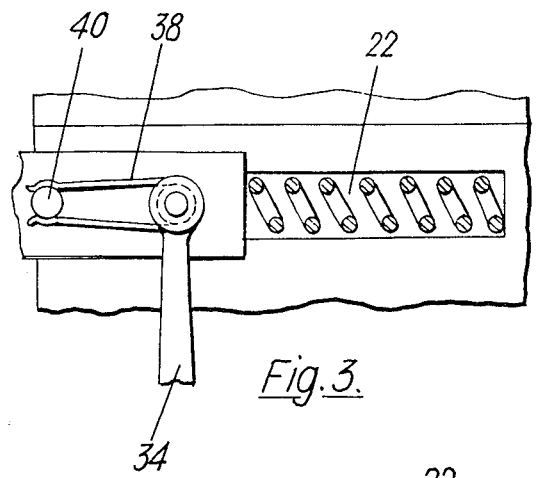

United States Patent [19]
Johnson et al.

[11] 3,951,019
[45] Apr. 20, 1976

[54] MACHINE TOOLS

[75] Inventors: Reginald Francis Johnson, Leicester; Thomas James Potts, Littleover; Gordon Bridgman Jennings, Mansfield, all of England

[73] Assignee: Rolls-Royce (1971) Limited, London, England

[22] Filed: Feb. 25, 1975

[21] Appl. No.: 553,063

[30] Foreign Application Priority Data
Mar. 22, 1974 United Kingdom............... 12851/74

[52] U.S. Cl................................. 82/24 R; 82/1 C; 82/DIG. 1; 82/34 R
[51] Int. Cl.²..................... B23B 21/00; B23B 25/06
[58] Field of Search............... 82/DIG. 1, 1 C, 34 R, 82/24 R, DIG. 2

[56] References Cited
UNITED STATES PATENTS
2,600,453   6/1952   Weingart......................... 82/DIG. 1

OTHER PUBLICATIONS

"Machining With A Plasma Jet", J. A. Browning, Sept. 12, 1962, Metalworking Production, pp. 82 & 83.

*Primary Examiner*—Leonidas Vlachos
*Attorney, Agent, or Firm*—Cushman, Darby & Cushman

[57] ABSTRACT

A "transferred arc" plasma torch is mounted on a lathe tool post for the purpose of heating a workpiece by directing an ionised gas on it. The torch is spaced a fixed amount from the workpiece for operation but is movable to a further temporary position closer to the workpiece to facilitate initial striking of an electrical arc between the workpiece and itself.

4 Claims, 4 Drawing Figures

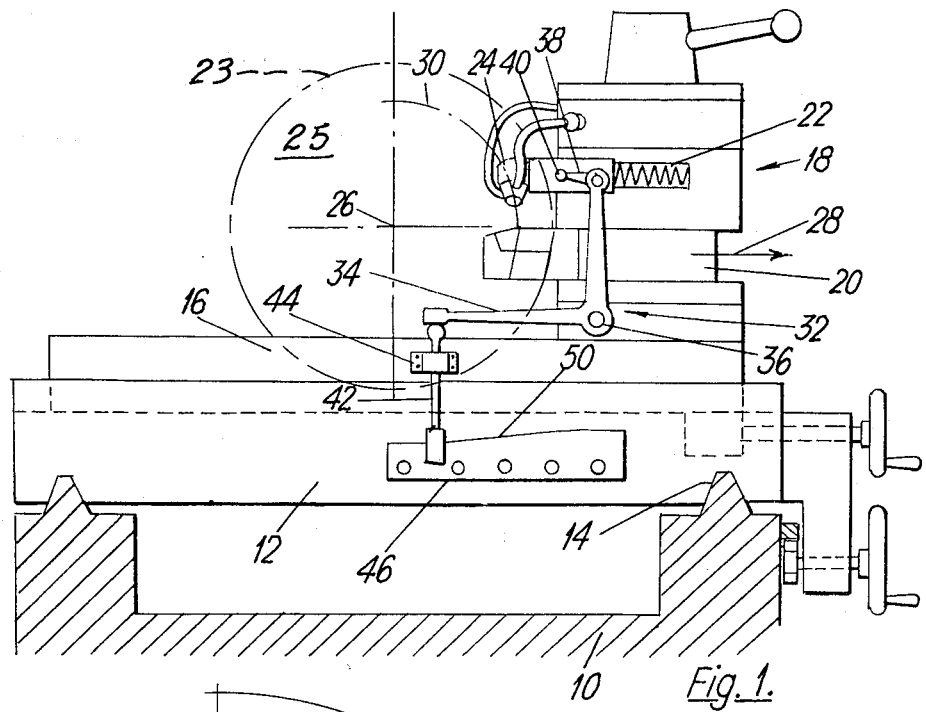
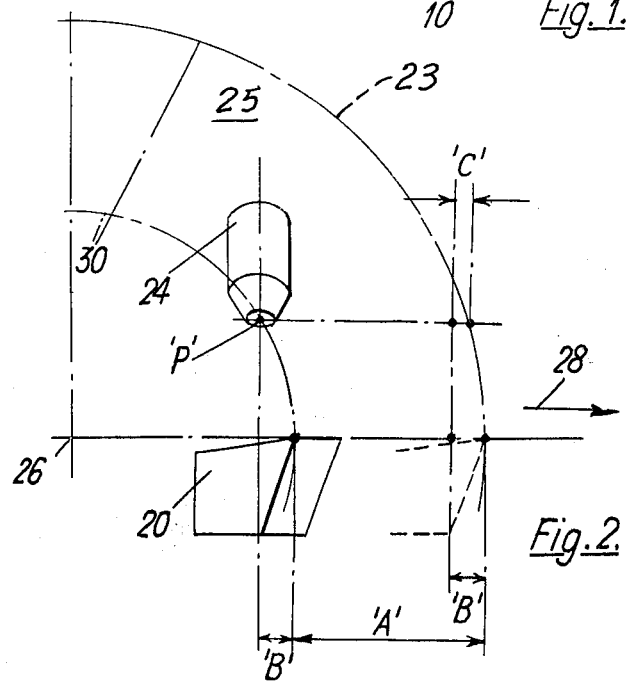

MACHINE TOOLS

This invention concerns machine tools which first heat and then cut a workpiece.

For several years, considerable research has been indulged in methods of, and equipment for, the treating of metals which are normally difficult to cut, so as to improve their cutting characteristics. One form of treatment which has proved successful, is the heating of the metal immediately prior to cutting it.

The equipment comprises either a "transferred arc" plasma arc torch or a welding torch, both of which produce a narrow, concentrated beam of heat energy, plus the appropriate gas, water and electrical supplies. However, such a form of treatment has created further problems as to the form of heating and the manner of mounting the heating equipment on the machine tool and manipulating that equipment.

For example, one problem is in the maintaining of the heat energy beam focussed on a point on a line on the workpiece surface being machined, which point contacts the cutting tool cutting edge during each revolution of the workpiece. In one particular machining operation, namely the end facing of a workpiece, wherein the cutting tool is traversing the workpiece end face, either towards or away from the axis of rotation, the point referred to hereinbefore moves on an arcuate path. However, the radius of arc is constantly reducing or increasing, depending on the said direction of traverse of the tool. Thus there arises the problem of also making a constant adjustment of the position of the focussed heat energy beam relative to the tool so as to maintain the beam on the same arc as the point which constantly contacts the cutting tool cutting edge per revolution of the workpiece.

Consequently the present invention comprises a tool for cutting a workpiece upon rotation of said workpiece, a source of localised heat energy adapted to be directed onto said workpiece so as to heat a local area of said workpiece immediately prior to machining of said area by said tool and a cam arrangement for causing relative movement between the heat source and the tool as the diameter at which said tool machines varies whereby to ensure that the heat source operates at the same diameter of said workpiece as said tool.

Figure 4:
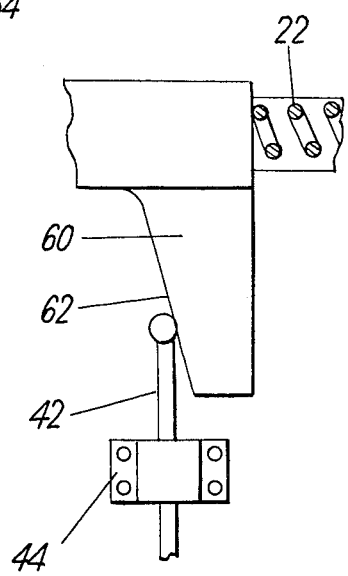

The invention will now be described by way of example and with reference to the accompanying drawings in which:

FIG. 1 is a general cross-sectional view of a lathe bed and includes a saddle and tool post, FIG. 2 is an enlarged part view of the tool post in FIG. 1 showing relative movement between tool and torch, FIG. 3 is an enlarged part view of the tool post in FIG. 1, and FIG. 4 is an enlarged part view of the embodiment in accordance with the invention.

In FIG. 1 a lathe bed 10 carries a saddle 12 which traverses the length of bed 10 on vee slides 14. Saddle 12 in turn carries a compound slide in the form of a cross slide 16 which traverses saddle 12 in a direction laterally of bed 10 and a tool post 18 which can either move with cross slide 16 or independently of it. The apparatus described so far is well known in the art.

Tool post 18 rigidly supports a cutting tool 20 and immediately thereabove provides a slide mounting 22 for a "transferred arc" plasma torch 24 hereafter referred to as "torch", the arrangement being such that the torch can slide relative to the tool post in a horizontal plane.

The purpose of the torch 24 is to preheat a workpiece 23 (shown schematically in broken lines) operatively supported on the lathe bed 10 for rotation in a known manner prior to cutting it with the cutting tool 20 so as to improve the machinability of the workpiece, which will reduce machining time and tool wear. Thus the nozzle of the torch is aligned with a point 'p' on the workpiece end face 25, at which the tool will start to cut, and then ignited. At the same time the workpiece 23 is caused to rotate about axis 26 by a power driven chuck (not shown) which grips one end of the workpiece 23 in a known manner and cross slide 16 is engaged with a drive (not shown) in known manner so that it, with tool post 18, traverses the saddle 12 in the direction of arrow 28.

Referring now to FIG. 2 it will be seen that if torch 24 is rigidly fixed to tool post 18 as is tool 20, then during machining of the workpiece and face 25, both torch 24 and tool 20 would traverse the same distance 'A' which in the present example, represents the width of workpiece end face 25 to be machined. The torch nozzle 24 and tool 20 are firstly aligned on a common arc 30 with the result that torch nozzle and tool lie in vertical planes which are spaced from each other by distance 'B' and if this positional relationship is maintained throughout operation, then at the end of the traverse, distance 'B' would be unchanged with the result that torch nozzle 24 and tool 20 would no longer be on a common arc, but are on separate arcs which are distance 'C' apart which would mean that metal other than that to be machined off, was being heated. Thus, there is provided a mechanism 32 (FIG. 1) comprising a cranked lever 34 pivotally attached at 36 to tool post 20 so as to be traversible therewith, and pivotally attached at its upper end, by a U shaped circlip 38, to a pin 40 on the body of torch 24. This feature is more clearly shown in FIG. 3. The other free end of lever 34 has its underside in abutment with the upper end of a cam follower 42 which is vertically slidably mounted in a guide 44 fixed to cross slide 16. The lower end of cam follower 44 is slidably located on a cam plate 46 fixed to saddle 12. The arrangement of the mechanism is such that on traversing of cross slide 16 in the direction of arrow 28 in a known manner, all of the mechanism described, with the exception of cam plate 46, traverses with it. The result is that cam follower 42 is caused to rise vertically on the sloping surface 50 of the cam plate and this causes lever 34 to rotate in a clockwise direction so that its upper end pulls on torch 24 via circlip 38 and pin 40 and moves it thereby, relative to tool post 20 and also in the direction of arrow 28.

The angle of the slope 50 on cam plate 46 and the lengths of the respective arms of lever 34 are calculated so as to cause torch 24 to move distance 'C' relative to tool post 20 at the same time as torch 24 is being moved with the tool post, the distance 'A', so that the overall movement of torch 24 is A + C.

The rate at which the torch moves distance A + C is such that as arc 30 increases in diameter when tool 20 moves to the right across the end face 25 of the rotating workpiece 23 as viewed in the drawings, so the nozzle is maintained in alignment with arc 30 which is, of course, progressively increasing in radial magnitude. Thus, only the workpiece metal which contacts the cutting edge of tool 20 receives the full effect of the heat from the torch.

In the foregoing description, constant reference has been made to a torch of the type known as the type known as the "transferred arc" plasma torch. However, it should be appreciated that any apparatus which produces a heat energy beam which can be focussed on a small locality, and which is of a size which lends itself to mounting on a lathe type machine tool can be utilised. For example, a welding torch of the kind which produces a focussable heat energy beam of an ignited mixture of oxygen and acetylene, or an electron beam gun, may be utilized.

An alternative apparatus for transmitting movement to the plasma torch via the cam follower 42 is shown in FIG. 4 and comprises a sine bar 60 rigidly fixed to the torch assembly so that its working face 62 is engaged by the cam follower 42. Thus during operation, resultant forces are obtained which cause the torch to move at a greater rate than the tool and tool post, so as to traverse distances A + C as previously described herein.

We claim:

1. A machine tool comprising: a lathe bed, a tool post movable mounted on said lathe bed, a tool mounted on said tool post for cutting a workpiece end face upon rotation of the workpiece, a source of localized heat arranged to be directed onto the workpiece end face so as to heat a local area thereof immediately prior to cutting the local area with said tool, and a cam arrangement for causing relative movement between said heat source and said tool, said cam arrangement including a cam plate having a cam profile, said cam plate being fixed relative to said movable tool post, an elongated cam follower slideably mounted on said tool post and relative movement transmitting means, the arrangement being such that one end of said cam follower engages with the cam profile on said cam plate and the other end of said cam follower operatively engages said relative movement transmitting means whereby during operational movement of said tool post and said cam follower relative to said fixed cam plate causes a further movement of said cam follower, which further movement is transmitted by said relative movement transmitting means to said heat source to move said heat source relative to said tool so that the local area immediately prior to cutting receives full effect of heat from said heat source.

2. A machine tool as claimed in claim 1 wherein said means for transmitting said relative movement by the cam follower to said localised heat energy source comprises a bell crank lever pivotably connected at a position between its ends to a tool post of said machine tool and having one end engaging said cam follower and the other end engaging said localised heat energy source.

3. A machine tool as claimed in claim 1 wherein said means for transmitting movement by said cam follower to said localised heat energy source comprises a sine bar rigidly attached to said localised heat energy source in a position such that in operation, its working face is engaged by the cam follower.

4. A machine tool as claimed in claim 1 wherein the localised heat energy source comprises a transferred arc plasma torch.

* * * * *